Feb. 2, 1932.  A. B. HALE  1,843,509

FRUIT PROCESSING APPARATUS

Filed April 18, 1930   2 Sheets-Sheet 1

Inventor
Arthur B. Hale
By Brown & Phelps
Attorneys

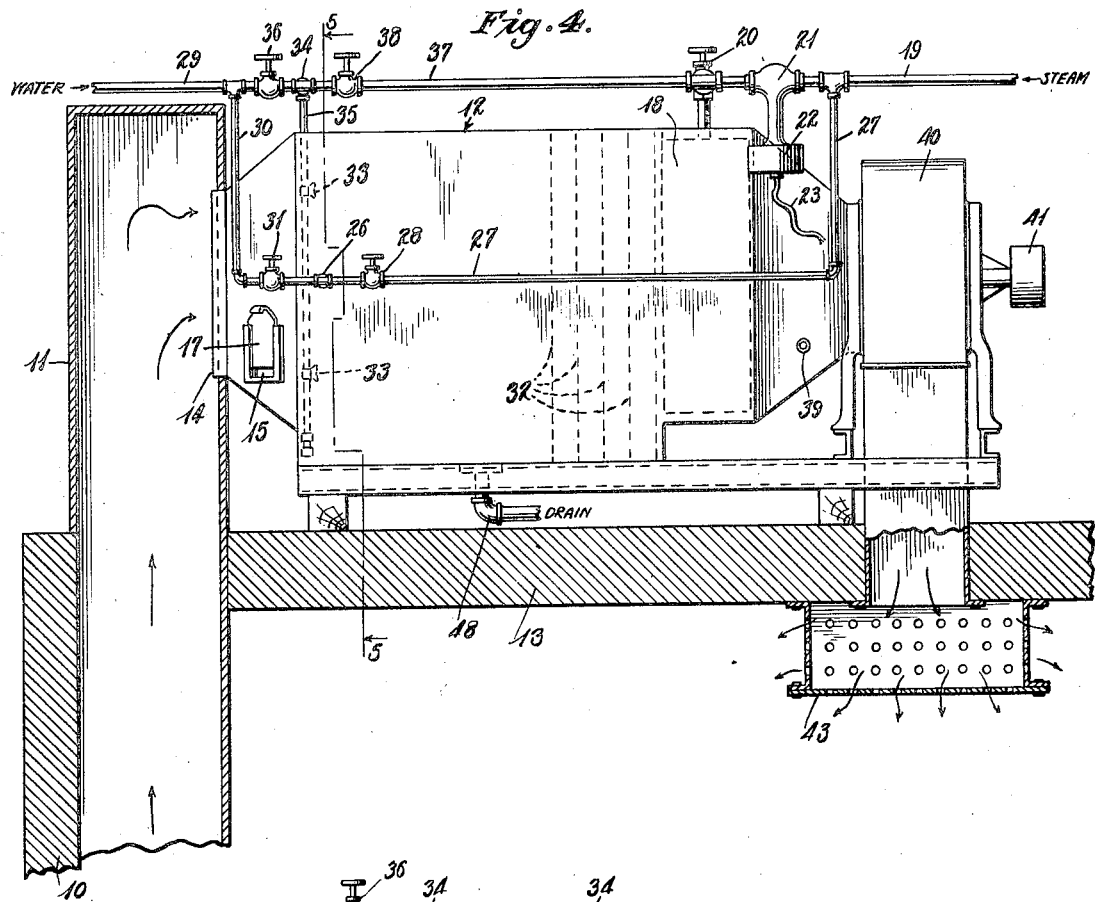
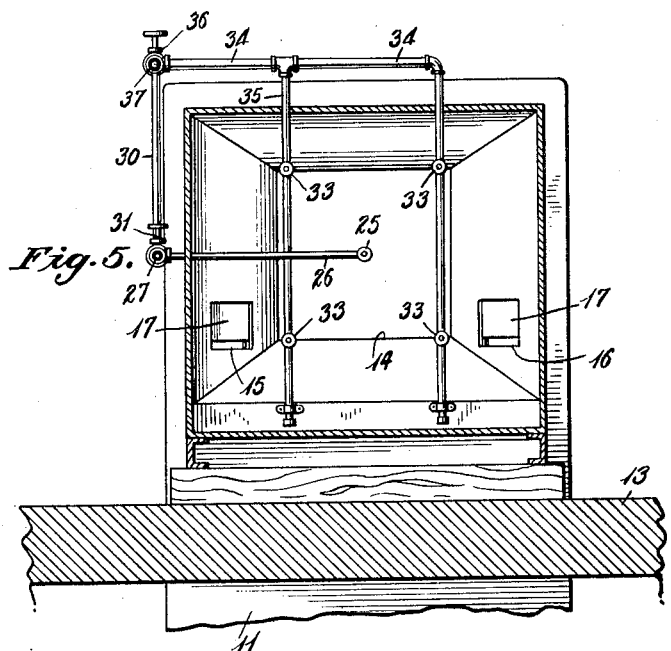

Patented Feb. 2, 1932

1,843,509

UNITED STATES PATENT OFFICE

ARTHUR B. HALE, OF TAMPA, FLORIDA

FRUIT PROCESSING APPARATUS

Application filed April 18, 1930. Serial No. 445,379.

The invention relates to apparatus for processing fruit and has as an object the provision of an apparatus enabling full control of the condition of the air as to humidity and temperature and condition of freshness with means for circulating the air about the fruit.

It is a further object of the invention to provide means for automatically controlling the temperature of the air in a fruit processing compartment combined with means to provide full control of the humidity of the air.

It is a further object of the invention to provide means for controlling temperature and humidity of air in processing fruit and means to introduce gases desirable in controlling the color of the fruit.

Further objects of the invention will appear from the following description when read in connection with the accompanying drawings showing an illustrative embodiment of the invention and wherein.

Figure 1:
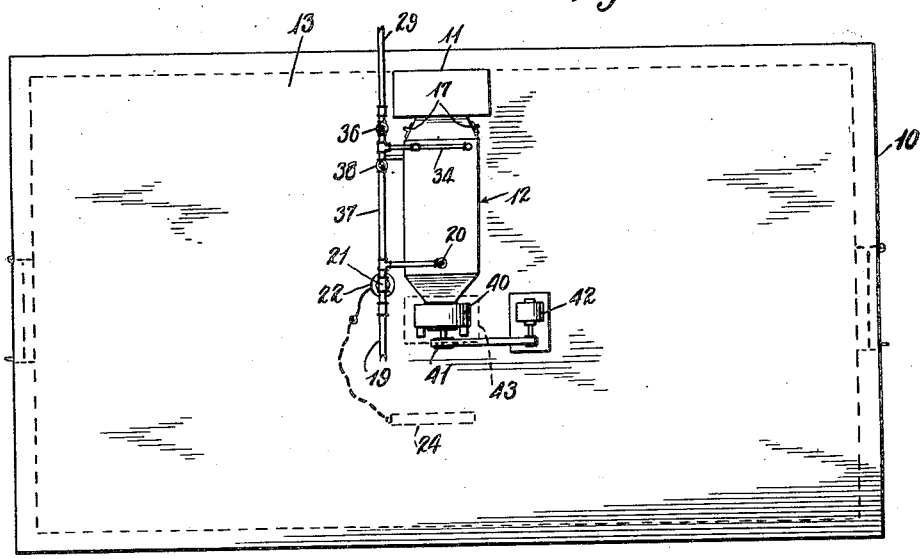
Fig. 1 is a plan view;
Figure 2:
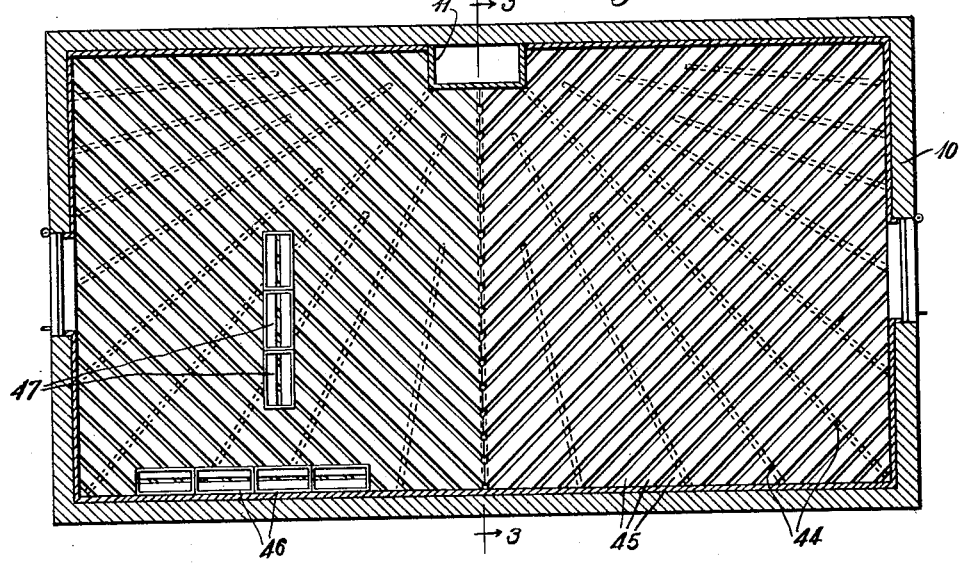
Fig. 2 is a horizontal section showing the floor of a compartment in plan.
Figure 3:
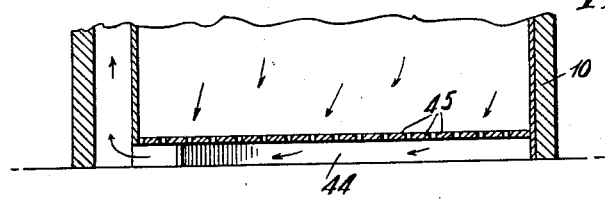
Fig. 3 is a detail vertical section on line 3—3 of Fig. 2.

Fig. 4 is a detail side elevation of the air conditioning apparatus upon an enlarged scale showing a portion of the structure in section, and, Fig. 5 is vertical transverse section on line 5—5 of Fig. 4.
As shown the apparatus comprises a compartment 10 having a slatted floor and a vertical conduit 11 leading from beneath the slats of the floor to the air processing apparatus indicated generally at 12. The conduit 11 is shown as projecting above the top wall 13 of the compartment and in communication with an outwardly flaring connector 14 leading into the air conditioning apparatus.

To introduce a desired portion of fresh air into the processing apparatus, there are shown openings 15, 16 in the connector 14 which may be controlled by dampers as indicated at 17.

To control the temperature of the air circulated through the apparatus 12, there is shown a heat radiator 18 of any desired form supplied with steam from pipe 19 under manual control of valve 20. To automatically control the temperature in the compartment, the steam supply may be controlled by a valve 21 operated by any well known form of valve control apparatus in casing 22 and controlled electrically through cable 23 leading from a thermostat 24 of any known form, which thermostat may be placed within the compartment at any desired location.

To control the humidity of the air circulated through compartment 10, there is shown a jet 25 connected with conduit 26, which conduit is connected with steam pipe 19 as by pipe 27 controlled by valve 28 and also connected with a cold water pipe 29 through pipe 30 under control of valve 31.

By the described system of pipes either steam or cold water or a combination of the two to provide wet steam may be injected into the air stream through jet 25. To eliminate drops of water from the air, an eliminating device is indicated in dotted lines at 32, which may comprise a plurality of zigzag plates providing a tortuous path for the air whereby free moisture will be deposited on the plates.

To cool the air, when necessary, circulating through the apparatus 12, there are shown water jets 33 connected by pipes 34, 35 with the cold water pipe 29 under control of valve 36, the pipe 34 being also connected with the steam pipe 19 through pipe 37 controlled by valve 38.

To inject gas into the air stream for providing a desirable color of the fruit, gas of a known character and by known apparatus may be injected through an orifice 39.

To cause circulation of air through the apparatus a fan in fan casing 40 is provided which may be driven through belt pulley 41 by means of a motor 42 indicated in Fig. 1. The delivery from the fan in casing 40 is through the perforated delivery head 43 into the top of the compartment 10.

To provide means for withdrawing air through the floor of the compartment 10 with substantial uniformity throughout, the floor is shown as formed of slats 45 spaced apart to provide cracks therebetween. A plurality of conduits for air drawn through the cracks, all leading to the conduit 11 are shown as provided by supporting the slats on joists 44 radiating from the conduit 11. To approximate an equal area of conduits between the radiating joists alternate joists are shortened adjacent the conduit 11, as the space between them becomes less. It has been found that with the slats running transversely of the compartment, and with the upward conduit from the floor at one end thereof, a crate of fruit lying upon the floor may so lie as to have the slots between the slats of the crate closed by one of the floor boards. To avoid this difficulty, as shown the conduit 11 is placed at the center of one of the long sides of the compartment; the joists 44 are placed radiating toward the compartment; and the floor boards 45 are placed at an angle of 45° to the length and width of the compartment. With this arrangement, crates indicated at 46 and 47 whether placed lengthwise or transversely of the compartment will not have the slots between their slats sealed by the floor boards.

The joists 44 are shown terminating at various distances from the conduit 11 so as to provide passages therebetween approaching a uniform capacity to provide as nearly as possible a uniform withdrawal of air through the floor of the compartment.

In the operation of the device the fan 40 causes air to be drawn downwardly in the compartment through the crates and about the fruit therein, through the slatted floor and upwardly in the conduit 11. A desired amount of fresh air is continuously introduced by adjustment of the dampers 17 and the circulating air is preserved at a desired temperature by means of thermally controlled valve 21.

In case the air is too warm even with heat omitted from radiator 18, cold water may be sprayed into the air stream through jets 33 and collecting in the bottom of the chamber of the apparatus 12 escape through drain 48.

If the air is not sufficiently moist, steam may be introduced by manipulation of valve 28, the pipe 27 leaving the pipe 19 between the source of steam supply and the thermally controlled valve 21, and the wetness of the steam may be controlled by manipulation of valve 31 to introduce cold water thereinto.

It will therefore be seen that the complete and convenient control of the temperature, humidity and condition of the air is readily possible.

Minor changes may be made in the physical embodiment of the invention within the scope of the appended claims without departing from the spirit of the invention.

I claim:

1. Fruit processing apparatus comprising, in combination, a fruit receiving chamber, a base for said chamber, an outlet conduit opening adjacent said base, joists radiating from said opening, spaced slats resting on said joists and extending diagonally to the length and width of said chamber, air conditioning apparatus in communication with said conduit, a conduit communicating with said apparatus and opening into the top of said chamber, said conditioning apparatus comprising means to at will cool or heat or/and humidify air passing therethrough, and means to circulate air through said chamber and apparatus.

2. Fruit processing apparatus comprising, in combination, an imperforate base, a closed compartment seated on said base, a conduit opening into said compartment adjacent said base and a wall of the compartment, joists seated on said base and converging toward said opening, certain of said joists extending continuously from other walls of said compartment to said opening and other of said joists extending from said other walls a portion only of the distance to said opening, said shorter joists interposed between said continuous joists whereby to provide passages of substantially uniform capacities between said joists, a perforated floor carried by said joists, a second conduit opening into said compartment above said floor and means in communication with said conduits to circulate air therethrough and through said compartment.

3. Fruit treatment apparatus comprising, in combination, an imperforate base, a closed compartment seated on said base comprising side and end walls and a ceiling, a vertical conduit adjacent one of said side walls, joists seated on said base converging toward said conduit, certain of said joists extending continuously from opposite walls to said conduit and other of said joists extending from said opposite walls a portion of the distance only toward said conduit whereby to provide passages of substantially uniform capacities between said joists, spaced slats supported by said joists to provide openings therebetween into said passages, a fan casing having its intake in communication with said conduit, a fan in said casing, a delivery head adjacent said ceiling and having openings, a conduit connecting the outlet of said casing with said delivery head, a steam jet opening into said last named conduit whereby operation of said fan may cause substantially uniform withdrawal of air through said slatted floor and delivery of said air and steam at the ceiling of said compartment.

ARTHUR B. HALE.